(12) United States Patent
Takeichi et al.

(10) Patent No.: US 7,376,493 B2
(45) Date of Patent: May 20, 2008

(54) VEHICLE-SURROUNDINGS MONITOR APPARATUS

(75) Inventors: Masakazu Takeichi, Okazaki (JP); Yoshihisa Sato, Nagayo (JP)

(73) Assignee: DENSO CORPORATION, Kariya (JP)

( * ) Notice: Subject to any disclaimer, the term of this patent is extended or adjusted under 35 U.S.C. 154(b) by 68 days.

(21) Appl. No.: 11/153,369

(22) Filed: Jun. 16, 2005

(65) Prior Publication Data
US 2006/0009883 A1  Jan. 12, 2006

(30) Foreign Application Priority Data
Jul. 6, 2004  (JP) .............................. 2004-199328

(51) Int. Cl.
*G01S 15/00* (2006.01)
*G01S 13/08* (2006.01)
*G08G 1/06* (2006.01)

(52) U.S. Cl. .......................... 701/1; 701/36; 701/300; 367/99; 342/118; 340/903

(58) Field of Classification Search ............... 701/1, 701/36, 45, 47, 49, 93, 96, 300, 301; 367/99, 367/13, 118, 121, 129, 909; 340/901, 903; 342/69, 70
See application file for complete search history.

(56) References Cited

U.S. PATENT DOCUMENTS

| | | | | |
|---|---|---|---|---|
| 3,900,839 | A | | 8/1975 | Lynch et al. ........... 340/870.19 |
| 4,545,244 | A | * | 10/1985 | Yasuda et al. ................ 73/195 |
| 4,835,519 | A | | 5/1989 | Suzaki et al. ............... 340/538 |
| 5,373,482 | A | * | 12/1994 | Gauthier ........................ 367/99 |
| 5,410,479 | A | * | 4/1995 | Coker ........................... 701/23 |
| 5,694,373 | A | * | 12/1997 | Garde ......................... 367/135 |
| 6,203,498 | B1 | * | 3/2001 | Bunce et al. ............... 600/446 |
| 6,947,851 | B2 | * | 9/2005 | Jespersen .................... 702/45 |
| 6,989,739 | B2 | * | 1/2006 | Li ............................... 340/438 |
| 2002/0002582 | A1 | | 1/2002 | Ewing et al. .............. 709/202 |
| 2003/0034883 | A1 | | 2/2003 | Sato et al. .................. 340/435 |

FOREIGN PATENT DOCUMENTS

CN      2312464 Y    3/1999

(Continued)

OTHER PUBLICATIONS

First Office Communication from Chinese Patent Office issued on Mar. 16, 2007 for the corresponding Chinese patent application No. 2005/10082505.8 (a copy and English translation thereof).

(Continued)

*Primary Examiner*—Jack W. Keith
*Assistant Examiner*—Edward Pipala
(74) *Attorney, Agent, or Firm*—Posz Law Group, PLC

(57) ABSTRACT

A vehicle-surroundings monitor apparatus according is provided with a sensor having a transmission/reception means for transmitting an ultrasonic wave to surroundings of a vehicle and receiving a reflected ultrasonic wave from the surroundings, a transmission circuit for generating an ultrasonic wave to be transmitted from the transmission/reception means, and a reception-processing means for processing an ultrasonic wave received by the transmission/reception means, and a control means for supplying a power-supply voltage to the sensor. A power-supply voltage supplied by the control means to the sensor is split into a power-supply voltage to be supplied to the transmission circuit and a power-supply voltage to be supplied to the reception-processing means.

5 Claims, 4 Drawing Sheets

FOREIGN PATENT DOCUMENTS

JP          A-3-138587         6/1991
JP          A-2005-24255       1/2005

OTHER PUBLICATIONS

Office Communication from European Patent Office issued on Oct. 23, 2006 for the corresponding European patent application No. 05013699.3-2220 (a copy and English translation thereof).

Partial Search Report from European Patent Office issued on Aug. 4, 2006 for the corresponding European patent application No. 05013699.3-2220 (a copy and English translation thereof).

Office Communication from European Patent Office issued on Mar. 9, 2007 for the corresponding European patent application No. 05013699.3-2220 (a copy and English translation thereof).

\* cited by examiner

VEHICLE-SURROUNDINGS MONITOR APPARATUS

CROSS REFERENCE TO RELATED APPLICATION

This application is based upon, claims the benefit of priority of, and incorporates by reference the contents of, Japanese Patent Application No. 2004-199328 filed on Jul. 6, 2004.

FIELD OF THE INVENTION

The present invention relates to a vehicle-surroundings monitor apparatus for monitoring things existing at locations surrounding a vehicle.

BACKGROUND OF THE INVENTION

The applicant for a patent of the present invention has proposed a vehicle-surroundings monitor apparatus described in Japanese Patent Application No. 2003-186603 applied earlier. This vehicle-surroundings monitor apparatus for a vehicle comprises a plurality of ultrasonic-wave sensors each having a processing function as sensors each used for measuring a distance to a body located in the vicinity of the vehicle and a control ECU for controlling the ultrasonic-wave sensors. The ultrasonic-wave sensors are connected to the control ECU by communication lines allowing data to be exchanged between the sensors and the ECU.

Each of the ultrasonic-wave sensors has a microphone, a transmission circuit, an IC and a regulator. The microphone is a component for transmitting an ultrasonic wave and receiving an ultrasonic wave reflected by a body existing in the vicinity of the vehicle. (An ultrasonic wave reflected by such a body is referred to hereafter as a reflected ultrasonic wave). The transmission circuit is a component for generating high-frequency and high-voltage pulses (having a typical frequency of several tens of kHz) for transmitting the ultrasonic wave from the microphone. The IC is a component for carrying out reception processing based on the reflected ultrasonic wave received by the microphone. The regulator is a component for converting a power-supply voltage received from the control ECU as a voltage for driving the ultrasonic-wave sensor into a constant voltage and also a component for supplying the constant voltage to the transmission circuit and the IC respectively.

When such an ultrasonic-wave sensor receives a command to find a distance to a body from the control ECU, the transmission circuit transmits an ultrasonic wave generated by the transmission circuit by way of the microphone and the microphone receives a reflected ultrasonic wave from a body existing in the vicinity of the vehicle. In addition, a period of time between the transmission of the ultrasonic wave and the reception of the reflected ultrasonic wave is measured. Then, a distance to the body is found based on the measured period of time. The distance is the distance between the microphone and the body.

In the ultrasonic-wave sensor described above, the regulator converts a power-supply voltage received from the control ECU into a constant voltage and supplies the constant voltage to the transmission circuit and the IC.

The inventors of the present invention have clearly found out that it is quite within the bounds of possibility that an ultrasonic-wave sensor employed in the vehicle-surroundings monitor apparatus having a processing function or, to be more specific, the IC employed in the ultrasonic-wave sensor does not operate normally as described below.

As described above, the ultrasonic-wave sensor having a processing function receives a power-supply voltage from the control ECU. The regulator converts this power-supply voltage into a constant voltage to be supplied to the transmission circuit and the IC so as to operate the ultrasonic-wave sensor having a processing function.

In order to transmit an ultrasonic wave from the microphone, the transmission circuit generates high-frequency high-voltage pulses. Then, the transmission circuit outputs the high-frequency high-voltage pulses to the microphone. Since the high-frequency high-voltage pulses are a voltage signal vibrating at a predetermined period, when the transmission circuit outputs the high-frequency high-voltage pulses, a voltage on the input side of the transmission circuit fluctuates due to an effect of the high-frequency high-voltage pulses. Thus, a voltage appearing on a wire supplying a power-supply voltage to the transmission circuit also varies.

An effect of the varying voltage propagates to the regulator through the wire connecting the transmission circuit to the regulator and also propagates to the IC through a wire connecting the regulator to the IC. Thus, a power-supply voltage supplied from the regulator to the IC also varies. As a result, in some cases, the IC receives a power-supply voltage lower than a power-supply voltage normally supplied to the IC.

That is to say, every time the transmission circuit generates a high-frequency high-voltage pulse and outputs the high-frequency high-voltage pulse to the microphone, a change in voltage results in the ultrasonic-wave sensor having a processing function. Thus, every time an ultrasonic wave is transmitted, a change in voltage is generated in a power-supply voltage supplied to the IC. As a result, a power-supply voltage necessary for operating the IC normally is no longer supplied to the IC. It is therefore quite within the bounds of possibility that the IC is reset, that is, internal circuits embedded in the IC do not operate.

SUMMARY OF THE INVENTION

It is thus an object of the present invention addressing the problems described above to provide a vehicle-surroundings monitor apparatus capable of supplying a stable power-supply voltage to an IC for carrying out processing to receive an ultrasonic wave.

In order to achieve the object described above, a vehicle-surroundings monitor apparatus according to a first aspect is provided with: a sensor having: a transmission/reception means for transmitting an ultrasonic wave to surroundings of a vehicle and receiving a reflected ultrasonic wave from the surroundings; a transmission circuit for generating an ultrasonic wave to be transmitted from the transmission/reception means; and a reception-processing means for processing an ultrasonic wave received by the transmission/reception means; and a control means for supplying a power-supply voltage to the sensor.

The vehicle-surroundings monitor apparatus is used for measuring a distance to a body existing in the vicinity of a vehicle employing the vehicle-surroundings monitor apparatus based on a period of time between transmission of an ultrasonic wave from the transmission/reception means and reception of a reflected ultrasonic wave by the transmission/reception means and is characterized in that a power-supply voltage supplied by the control means to the sensor is split into a power-supply voltage to be supplied to the transmission circuit and a power-supply voltage to be supplied to the reception-processing means, and the power-supply voltage to be supplied to the transmission circuit and the power-supply voltage to be supplied to the reception-processing means are supplied to the transmission circuit and the reception-processing means respectively.

As described above, when a power-supply voltage is supplied from the control means to the sensor, the power-supply voltage is split into a power-supply voltage to be supplied to the transmission circuit and a power-supply voltage to be supplied to the reception-processing means, and the power-supply voltage to be supplied to the transmission circuit and the power-supply voltage to be supplied to the reception-processing means are supplied to the transmission circuit and the reception-processing means respectively. Thus, the sensor can be devised into such a configuration that the power-supply voltage to be supplied to the transmission circuit and the power-supply voltage to be supplied to the reception-processing means do not have an effect on each other. As a result, the control means is capable of supplying a stable power-supply voltage to the reception-processing means without an effect of a voltage change, which results in generation of an ultrasonic wave in the transmission circuit, on the reception-processing means.

According to a second aspect, the sensor comprises: a first constant-voltage circuit for converting a power-supply voltage received from the control means into a constant voltage determined in advance and outputting the constant voltage to the reception-processing means; and a filter for absorbing voltage variations, which results in the transmission circuit while the transmission circuit is generating an ultrasonic wave, as variations in power-supply voltage, wherein: a power-supply voltage generated by the control means is supplied to the first constant-voltage circuit employed in the sensor and converted by the first constant-voltage circuit into a constant power-supply voltage to be supplied to the reception-processing means and the filter; and a power-supply voltage supplied to the filter is fed to the transmission circuit.

As described above, a power-supply voltage generated by the control means is supplied to the first constant-voltage circuit employed in the sensor and converted by the first constant-voltage circuit into a constant power-supply voltage, which is then supplied to the reception-processing means. A power-supply voltage from the first constant-voltage circuit is also supplied to the transmission circuit by way of the filter. Thus, even when variations in power-supply voltage are generated in the transmission circuit while the transmission circuit is generating an ultrasonic wave, the filter is capable of absorbing the variations in power-supply voltage. As a result, the power-supply voltage supplied to the reception-processing means can be separated from the power-supply voltage supplied to the transmission circuit. In addition, the first constant-voltage circuit is capable of always supplying a stable power-supply voltage to the reception-processing means.

According to a third aspect, the sensor comprises a first constant-voltage circuit for converting a power-supply voltage received from the control means into a constant voltage determined in advance and outputting the constant voltage to the reception-processing means and a second constant-voltage circuit wherein: a power-supply voltage supplied from the control means to the sensor is fed to the first constant-voltage circuit and the second constant-voltage circuit; the power-supply voltage fed to the first constant-voltage circuit is converted into the constant voltage to be supplied to the reception-processing means; and the power-supply voltage fed to the second constant-voltage circuit is converted into a constant voltage to be supplied to the transmission circuit.

As described above, a power-supply voltage supplied from the control means to the sensor is fed to the first constant-voltage circuit and the second constant-voltage circuit, the power-supply voltage fed to the first constant-voltage circuit is converted into a constant voltage to be supplied to the reception-processing means and the power-supply voltage fed to the second constant-voltage circuit is converted into a constant voltage to be supplied to the transmission circuit. Thus, the power-supply voltage supplied to the reception-processing means can be separated from the power-supply voltage supplied to the transmission circuit. As a result, by virtue of the existence of the first constant-voltage circuit and the second constant-voltage circuit, the first constant-voltage circuit is capable of always supplying a stable power-supply voltage to the reception-processing means without being affected by variations in power-supply voltage, which are generated while the transmission circuit is generating an ultrasonic wave.

According to a fourth aspect, the control means supplies a power-supply voltage to the sensor through a first power-supply wire and a power-supply voltage to the sensor through a second power-supply wire electrically separated from the first power-supply wire; the reception-processing means directly receives the power-supply voltage supplied by the control means through the first power-supply wire; and the transmission circuit directly receives the power-supply voltage supplied by the control means through the second power-supply wire.

As described above, when the control means supplies power-supply voltages to the sensor, the power-supply voltages are fed to the reception-processing means and the transmission circuit through respectively the first and second power-supply wires, which each serve as a dedicated power-supply wire. Thus, the power-supply voltage supplied to the reception-processing means can be separated from the power-supply voltage supplied to the transmission circuit. As a result, variations in power-supply voltage, which are generated while the transmission circuit is generating an ultrasonic wave, can be prevented from having an effect on the reception-processing means. In addition, the reception-processing means is capable of always receiving a stable power-supply voltage from the control means.

According to a fifth aspect, the sensor comprises a first constant-voltage circuit for converting a power-supply voltage received from the control means into a constant voltage determined in advance and outputting the constant voltage to the reception-processing means wherein: the power-supply voltage supplied by the control means to the sensor is fed to the transmission circuit and the first constant-voltage circuit; and the power-supply voltage fed to the first constant-voltage circuit is converted into the constant voltage before being supplied to the reception-processing means.

As described above, a power-supply voltage supplied by the control means to the sensor is fed to the transmission circuit directly and fed to the reception-processing means by way of the first constant-voltage circuit for converting the power-supply voltage into the constant voltage, which is then fed to the reception-processing means. Thus, the reception-processing means always receives the constant voltage from the first constant-voltage circuit. As a result, a stable power-supply voltage is supplied to the reception-processing means.

According to a sixth aspect, the control means is connected to a plurality of sensors by a communication line and a power-supply voltage is supplied from the control means to each of the sensors in a daisy-chain method. In this way, a daisy-chain method can be adopted for supplying a power-supply voltage from the control means to each of the sensors.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENTS

First Embodiment

A first embodiment of the present invention is described by referring to a diagram as follows.

Figure 1:
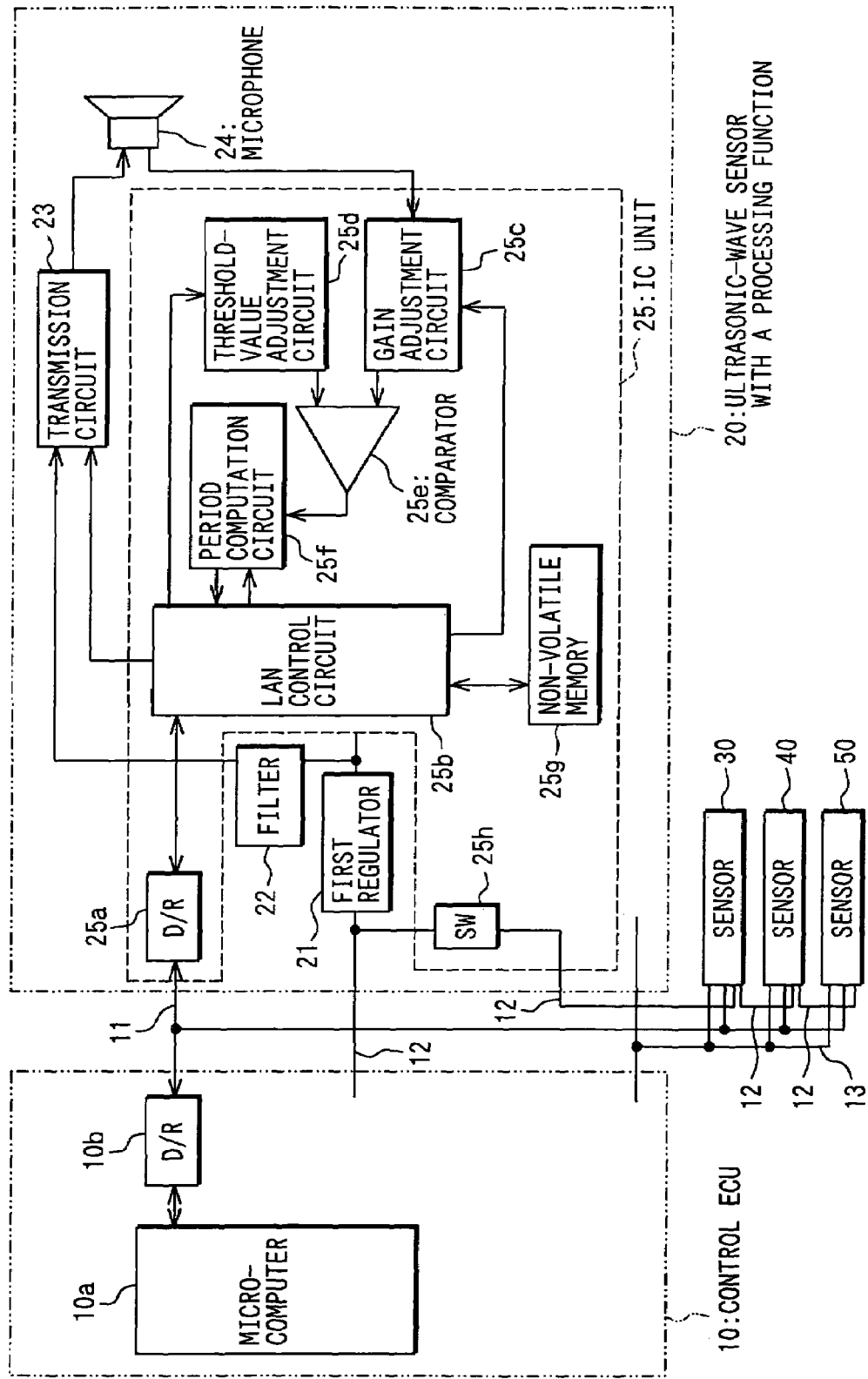
FIG. 1 is a block diagram showing the configuration of a vehicle-surroundings monitor apparatus according to a first embodiment.

FIG. 1 is a block diagram showing the configuration of a vehicle-surroundings monitor apparatus implemented by a first embodiment of the present invention. As shown in FIG. 1, the vehicle-surroundings monitor apparatus has a control ECU 10 and ultrasonic-wave sensors with a processing function 20 to 50 exchanging signals with the control ECU 10 through a communication line 11.

In addition, the ultrasonic-wave sensor with a processing function 20 receives a power-supply voltage supplied by the control ECU 10 through a first power-supply line 12 and the ultrasonic-wave sensors with a processing function 20 to 50 are connected to each other by the first power-supply line 12 in a daisy-chain configuration. The control ECU 10 is also connected to the ultrasonic-wave sensors with a processing function 20 to 50 by a ground line 13.

In a vehicle, the control ECU 10 controls the ultrasonic-wave sensors with a processing function 20 to 50 to carry out processing to find a distance to an obstruction (a body existing in the vicinity of the vehicle). The control ECU 10 has a microcomputer 10a and a LAN communication circuit 10b (which is referred to hereafter as a D/R standing for a driver/reader).

The microcomputer 10a comprises a CPU (Central Processing Unit), a ROM and a RAM, which are integrated in a one-chip IC. Such a microcomputer 10a communicates with the ultrasonic-wave sensors with a processing function 20 to 50 through the D/R 10b and the communication line 11 to assign an ID to each of the ultrasonic-wave sensors with a processing function 20 to 50 . Thus, the microcomputer 10a is capable of carrying out processing to identify each of the ultrasonic-wave sensors with a processing function 20 to 50 in addition to processing to request each of the ultrasonic-wave sensors with a processing function 20 to 50 to detect a body existing in the vicinity of the vehicle. The D/R 10b thus serves as an interface for carrying out communications between the microcomputer 10a and the ultrasonic-wave sensors with a processing function 20 to 50 . The control ECU 10 having such a configuration is always driven to operate by a power-supply voltage generated by typically an onboard battery. It is to be noted that the control ECU 10 corresponds to a control means provided by the present invention.

The ultrasonic-wave sensors with a processing function 20 to 50 each receive a command from the control ECU 10 and carry out processing to transmit and receive an ultrasonic wave. The ultrasonic-wave sensors with a processing function 20 to 50 each comprise a first regulator 21, a filter 22, a transmission circuit 23, a microphone 24 and an IC unit 25. Since the ultrasonic-wave sensors with a processing function 20 to 50 have the same configuration, only the ultrasonic-wave sensor with a processing function 20 is explained in the following description.

The first regulator 21 is a constant-voltage circuit for converting a power-supply voltage supplied by the control ECU 10 into a constant voltage lower than the power-supply voltage. The first regulator 21 supplies the constant voltage obtained as a result of the conversion to the filter 22 and the IC unit 25. It is to be noted that the first regulator 21 corresponds to a first constant-voltage circuit provided by the present invention. In addition, the power-supply voltage supplied by the control ECU 10 to the ultrasonic-wave sensor with a processing function 20 is also fed to a switch 25h employed in the IC unit 25. (Abbreviated to SW in the following description.) The switch 25h will be explained later.

The filter 22 passes on or blocks only signals each having a frequency in a specific frequency range. The filter 22 has a constant having a value according to the frequency of a transmitted ultrasonic wave as a constant for absorbing variations occurring in the transmission circuit 23 as variations in power-supply voltage. For example, a low-pass filter is employed as such a filter 22. This filter 22 passes on a power-supply voltage received from the first regulator 21 and outputs the power-supply voltage to the transmission circuit 23.

In this embodiment, the filter 22 eliminates effects of voltage variations generated in the transmission circuit 23. That is, the filter 22 is capable of absorbing high-frequency components of a transmission signal. Thus, when a signal in the high-frequency band is supplied from the transmission circuit 23 to the filter 22 in a process to output a transmission signal generated in the transmission circuit 23, the filter 22 works to block the signal.

As described above, in the ultrasonic-wave sensor with a processing function 20, a power-supply voltage output by the first regulator 21 and further passed on by the filter 22 is supplied to the transmission circuit 23 but, on the other hand, the IC unit 25 receives directly the power-supply voltage output by the first regulator 21. In this configuration, the filter 22 also absorbs voltage variations occurring in generation of an ultrasonic wave in the transmission circuit 23. Thus, effects of the variations in voltage never propagate to the IC unit 25 by way of the first regulator 21. As a result, the power-supply voltage supplied to the IC unit 25 is in a continuously stable state and, hence, the IC unit 25 is capable of carrying out reception processing normally.

Based on a power-supply voltage supplied from the first regulator 21 by way of the filter 22, the transmission circuit 23 generates a transmission signal for transmitting an ultrasonic wave from the microphone 24 to be described later. To put it concretely, the transmission circuit 23 converts the input power-supply voltage into a pulse voltage having a frequency of several tens of kHz and outputs the pulse voltage to the microphone 24 as the transmission signal.

The microphone 24 is a component for transmitting and receiving an Ultrasonic wave. The microphone 24 has a wave-transmitting/receiving unit (not shown in the figure) for generating an ultrasonic wave and receiving a reflected ultrasonic wave from a body existing in the vicinity of the vehicle. The wave-transmitting/receiving unit employed in such a microphone 24 transmits an ultrasonic wave based on a transmission signal received from the transmission circuit 23 and receives a reflected ultrasonic wave from a body existing in the vicinity of the vehicle after completing the transmission of the ultrasonic wave. Then, the microphone 24 converts the reflected ultrasonic wave received from the body into typically a voltage signal and outputs the voltage signal as a received signal.

The microphone 24 is provided typically on the bumper or cover of the vehicle in such a way that its face for transmitting and receiving an ultrasonic wave is exposed to the outside of the vehicle. It is to be noted that the microphone 24 corresponds to a transmission/reception means provided by the present invention.

The IC unit 25 is a component for carrying out reception processing based on a received signal supplied by the microphone 24. Such an IC unit 25 comprises the D/R 25a, a LAN control circuit 25b, a gain adjustment circuit 25c, a threshold-value adjustment circuit 25d, a comparator 25e, a period computation circuit 25f, a non-volatile memory 25g and the switch 25h. It is to be noted that the IC unit 25 corresponds to a reception-processing means provided by the present invention.

The D/R 25a is an interface for allowing the IC unit 25 to carry out communications with the microcomputer 10a employed in the control ECU 10.

The LAN control circuit 25b is a component for receiving a command issued by the control ECU 10 by way of the D/R 10b, the D/R 25a and the communication line 11. The LAN control circuit 25b carries out processing to drive the transmission circuit 23 to generate an ultrasonic wave, processing to measure a period of time between transmission of an ultrasonic wave and reception of the reflected ultrasonic wave and processing to supply a power-supply voltage to the ultrasonic-wave sensors with a processing function 30 to 50. The LAN control circuit 25b for carrying out such pieces of processing comprises a microcomputer and a RAM.

The gain adjustment circuit 25c is the so-called amplifier for amplifying an input signal. The gain adjustment circuit 25c amplifies a signal received from the microphone 24 and supplies the amplified signal to the comparator 25e.

The threshold-value adjustment circuit 25d is a component for setting a threshold value used for determining whether or not the received signal indicates an ultrasonic wave reflected by a body existing in the vicinity of the vehicle. The threshold value is typically a predetermined voltage value. The threshold-value adjustment circuit 25d outputs the threshold value to the comparator 25e.

The comparator 25e is a component for comparing an input signal with the threshold value and outputting a result of the comparison. To put it concretely, the comparator 25e compares the signal received from the gain adjustment circuit 25c with the threshold voltage generated by the threshold-value adjustment circuit 25d and outputs a signal representing the result of the comparison. That is, when the received signal exceeds the threshold voltage, the comparator 25e outputs a high signal to the period computation circuit 25f as the output signal. When the received signal does not exceed the threshold voltage, on the other hand, the comparator 25e outputs a low signal to the period computation circuit 25f as the output signal.

The period computation circuit 25f is a component for measuring a period of time between transmission of an ultrasonic wave from the microphone 24 and reception of the reflected ultrasonic wave. To put it concretely, the period computation circuit 25f inputs a time to transmit an ultrasonic wave from the LAN control circuit 25b and starts the measurement. Then, as the period computation circuit 25f receives a signal indicating that a received signal exceeds the threshold voltage (that is, as the period computation circuit 25f receives a high signal) from the comparator 25e, the period computation circuit 25f ends the measurement and supplied the measured period of time to the LAN control circuit 25b.

The non-volatile memory 25g is a memory for storing data used for measuring a period of time between transmission of an ultrasonic wave by the LAN control circuit 25b and reception of the reflected ultrasonic wave. The data includes the threshold value of the threshold-value adjustment circuit 25d and the amplification degree of the gain adjustment circuit 25c.

The switch 25h is a component for supplying a power-supply voltage received by the ultrasonic-wave sensor with a processing function 20 from the control ECU 10 to the ultrasonic-wave sensors with a processing function 30 to 50 by adoption of the daisy-chain method as described before. The switch 25h is typically a mechanical relay switch or a semiconductor switch such as a field-effect transistor.

Receiving a command from the LAN control circuit 25b, the switch 25h closes or opens the first power-supply line 12 between the ultrasonic-wave sensor with a processing function 20 and the ultrasonic-wave sensor with a processing function 30 provided at a stage following the ultrasonic-wave sensor with a processing function 20.

Since a power-supply voltage is supplied to the ultrasonic-wave sensors with a processing function 20 to 50 by adoption of the daisy-chain method in this way, the switches provided on the ultrasonic-wave sensors with a processing function 20 to 50 are connected to each other in series along the first power-supply line 12. Thus, in this embodiment, when the control ECU 10 supplies a power-supply voltage to the ultrasonic-wave sensor with a processing function 20, the power-supply voltage is supplied to the ultrasonic-wave sensors with a processing function 20 to 50 sequentially as follows: from the ultrasonic-wave sensor with a processing function 20 to the ultrasonic-wave sensor with a processing function 30, then from the ultrasonic-wave sensor with a processing function 30 to the ultrasonic-wave sensor with a processing function 40 and, finally, from the ultrasonic-wave sensor with a processing function 40 to the ultrasonic-wave sensor with a processing function 50.

Such ultrasonic-wave sensors with a processing function 20 to 50 are provided typically on the rear side of the vehicle, being individually oriented in different directions such as the left rear side, the true rear side and the right rear side. It is to be noted that the ultrasonic-wave sensors with a processing function 20 to 50 correspond to a sensor provided by the present invention.

The above description explains the configuration of the vehicle-surroundings monitor apparatus according to the first embodiment. Such a vehicle-surroundings monitor apparatus is required to detect a body existing in range of typically 0.5 to 1.5 m from the vehicle and find a distance to the body by computation.

Next, the operation of the vehicle-surroundings monitor apparatus according to the embodiment is explained. First of all, when an ignition of the vehicle is turned on, the control ECU 10 enters a state of being capable of operating. Then, the control ECU 10 supplies a power-supply voltage to the ultrasonic-wave sensor with a processing function 20 through the first power-supply line 12. Thus, the ultrasonic-wave sensor with a processing function 20 also enters a state of being capable of operating.

To put it concretely, when the control ECU 10 supplies a power-supply voltage to the ultrasonic-wave sensor with a processing function 20, the power-supply voltage is fed to the first regulator 21 employed in the ultrasonic-wave sensor with a processing function 20. Subsequently, the first regulator 21 converts the power-supply voltage into a constant voltage, which is then supplied to the filter 22 and the IC unit 25.

The power-supply voltage supplied to the filter 22 is fed to the transmission circuit 23. On the other hand, the power-supply voltage supplied to the IC unit 25 is fed to the D/R 25a, the LAN control circuit 25b, the gain adjustment circuit 25c, the threshold-value adjustment circuit 25d, the comparator 25e, the period computation circuit 25f and the non-volatile memory 25g, which are employed in the IC unit 25. Thus, the IC unit 25 also enters a state of being capable of operating.

Then, processing to identify each of the ultrasonic-wave sensors with a processing function 20 to 50 is carried out. First of all, the microcomputer 10a employed in the control ECU 10 generates an ID to each of the ultrasonic-wave sensors with a processing function 20 to 50 and outputs an ID to the ultrasonic-wave sensor with a processing function 20 by way of the D/R 10b, the D/R 25a and the communication line 11. As the ultrasonic-wave sensor with a processing function 20 receives an ID, the ID is stored in the LAN control circuit 25b employed in the IC unit 25 and the LAN control circuit 25b turns on the switch 25h. Thus, the power-supply voltage supplied by the control ECU 10 to the ultrasonic-wave sensor with a processing function 20 is passed on to the first regulator (not shown in the figure) of the ultrasonic-wave sensor with a processing function 30 by way of the switch 25h and the first power-supply line 12. As the power-supply voltage is supplied to the ultrasonic-wave sensor with a processing function 30, the ultrasonic-wave sensor with a processing function 30 also enters a state of being capable of operating. Then, an ID generated by the control ECU 10 as an ID different from the ID for identifying the ultrasonic-wave sensor with a processing function 20 is output to the ultrasonic-wave sensor with a processing function 30 through the communication line 11 as an ID for identifying the ultrasonic-wave sensor with a processing function 30.

Since the ID for identifying the ultrasonic-wave sensor with a processing function 20 has been given to the ultrasonic-wave sensor with a processing function 20, the ultrasonic-wave sensor with a processing function 20 does not accept the ID for identifying the ultrasonic-wave sensor with a processing function 30 even when the ultrasonic-wave sensor with a processing function 20 also receives the ID for identifying the ultrasonic-wave sensor with a processing function 30. Thus, the ID for identifying the ultrasonic-wave sensor with a processing function 30 is stored only in a LAN control circuit (not shown in the figure) of an IC unit employed in the ultrasonic-wave sensor with a processing function 30. In this way, the control ECU 10 is capable of identifying the ultrasonic-wave sensors with a processing function 20 and 30.

Thereafter, the power-supply voltage is passed on to the ultrasonic-wave sensors with a processing function 40 and 50 and, then, the control ECU 10 assigns an ID to each of the ultrasonic-wave sensors with a processing function 40 and 50 in the same way. In this way, the processing to assign an ID to each of the ultrasonic-wave sensors with a processing function 20 to 50 is completed.

Then, the control ECU 10 carries out processing to detect a body existing in the vicinity or the vehicle. First of all, the microcomputer 10a employed in the control ECU 10 issues a command to each of the ultrasonic-wave sensors with a processing function 20 to 50 through the communication line 11 as a command for making a request for processing to transmit and receive an ultrasonic wave. The following description explains the processing carried out by the ultrasonic-wave sensor with a processing function 20 to detect a body existing in the vicinity or the vehicle.

First of all, the microcomputer 10a sets a parameter representing a timing with which an ultrasonic wave is to be transmitted from the microphone 24. Then, the control ECU 10 outputs the parameter to the LAN control circuit 25b employed in the ultrasonic-wave sensor with a processing function 20 through the communication line 11. The LAN control circuit 25b acquires data (that is, the threshold value and the amplification degree) according to the input parameter from the non-volatile memory 25g, supplying the threshold value and the amplification degree to the threshold-value adjustment circuit 25d and the gain adjustment circuit 25c respectively. Thus, the amplification degree for a received signal is set in the gain adjustment circuit 25c while the threshold value (the threshold voltage) for the received signal is set in the threshold-value adjustment circuit 25d.

Then, the microcomputer 10a outputs a command to the LAN control circuit 25b as a command to transmit an ultrasonic wave from the microphone 24. Receiving the command, the LAN control circuit 25b requests the transmission circuit 23 to generate a transmission signal for transmitting the ultrasonic wave. That is, the transmission circuit 23 converts a power-supply voltage supplied by the first regulator 21 by way of the filter 22 into a transmission signal having a high frequency and outputs the transmission signal to the microphone 24. The microphone 24 then transmits an ultrasonic wave based on the transmission signal. At that time, the LAN control circuit 25b starts measuring time lapsing since the time to transmit the ultrasonic wave from the microphone 24. The time at which a counting operation is started to measure the lapsing time is referred to as a transmission timing.

In this way, an ultrasonic wave is transmitted from the microphone 24. When a body exists in the vicinity of the vehicle, the body reflects the ultrasonic wave and the microphone 24 receives the reflected ultrasonic wave. Then, the microphone 24 outputs the received ultrasonic wave reflected by the body to the gain adjustment circuit 25c as a received signal.

When the gain adjustment circuit 25c receives the signal from the microphone 24, the gain adjustment circuit 25c amplifies the received signal at the amplification degree set earlier in the gain adjustment circuit 25c. Then, the gain adjustment circuit 25c outputs the amplified signal to the comparator 25e.

The comparator 25e receives a threshold voltage from the threshold-value adjustment circuit 25d and the received signal from the gain adjustment circuit 25c, comparing the threshold voltage with the received signal. A time at which the received signal exceeds the threshold voltage is taken as a reception timing of the reflected ultrasonic wave. With the reception timing, the comparator 25e outputs a high signal to the period computation circuit 25f. When the received signal does not exceed the threshold voltage, on the other hand, the comparator 25e outputs a low signal to the period computation circuit 25f.

The period computation circuit 25f also receives the transmission timing mentioned above from the LAN control circuit 25b in addition to the high or low signal from the comparator 25e. Thus, when a high signal indicating a reception time is supplied to the period computation circuit 25f, the period computation circuit 25f finds a period T between the transmission time and the reception time. When a low signal is supplied to the period computation circuit 25f, on the other hand, the processing to compute the period is not carried out. The period computation circuit 25f outputs the computed period T to the LAN control circuit 25b.

Afterwards, the microcomputer 10a acquires the period T. To put it concretely, the LAN control circuit 25b outputs the period T to the microcomputer 10a based on the command issued by the microcomputer 10a to the LAN control circuit 25b. Thus, the microcomputer 10a acquires the period T between the transmission of an ultrasonic wave and the reception of the reflected ultrasonic wave.

Then, the microcomputer 10a computes the distance L between the body existing in the vicinity of the vehicle and the vehicle. That is, the microcomputer 10a multiplies the period T by a sound speed S and divides the product obtained as a result of the multiplication by 2 to get the distance L (=T×S/2). In this equation, the sound speed S has a value depending on the temperature and pressure of the air outside the vehicle. Thus, sensors for measuring the temperature and pressure of the air outside the vehicle supply signals representing the temperature and pressure of the air to the control ECU 10. The sensors themselves are not shown in the figure. The microcomputer 10a converts the signals into a temperature and pressure of the air outside the vehicle. Then, the microcomputer 10a selects a value of the sound speed S to be used in the computation of the distance L from a sound-speed map stored in advance based on the temperature and pressure of the air outside the vehicle. The sound-speed map is a map showing relations between the value of the sound speed S and the temperature and pressure of the air outside the vehicle. By referring to such a map, the value of the sound speed S can be determined.

Also for each of the ultrasonic-wave sensors with a processing function 30 to 50, a distance L is obtained in the same way as the ultrasonic-wave sensor with a processing function 20. By using an ID assigned to each of the ultrasonic-wave sensors with a processing function 20 to 50, the control ECU 10 is capable of easily identifying a ultrasonic-wave sensor with a processing function for which any of the distances L has been computed.

The distance L obtained in this way as a distance between the body existing in the vicinity of the vehicle and the vehicle is used for example in processing carried out to issue a warning to the driver.

As described above, in this embodiment, a power-supply voltage supplied by the control ECU 10 to the ultrasonic-wave sensor with a processing function 20 is fed to the first regulator 21 through the first power-supply line 12, and the first regulator 21 converts the power-supply voltage into a constant voltage, which is then supplied to the IC unit 25. The constant voltage is also supplied to the transmission circuit 23 by way of the filter 22.

As described above, a power-supply voltage supplied by the control ECU 10 to the ultrasonic-wave sensor with a processing function 20 is fed to the transmission circuit 23 and the IC unit 25 as separate voltages. Thus, since the transmission circuit 23 receives a power-supply voltage for operating the transmission circuit 23 while the IC unit 25 receives a power-supply voltage for operating the IC unit 25, the power-supply voltages supplied to the transmission circuit 23 and the IC unit 25 can be prevented from having an effect on each other. As a result, the control ECU 10 is capable of supplying a stable power-supply voltage all the time to the IC unit 25 without having the IC unit 25 affected by voltage variations occurring in generation of an ultrasonic wave in the transmission circuit 23.

In addition, in this embodiment, even when voltage variations occur in generation of an ultrasonic wave in the transmission circuit 23, the filter 22 is capable of absorbing the variations in voltage. Thus, the filter 22 is capable of blocking effects of the variations occurring in generation of an ultrasonic wave in the transmission circuit 23. As a result, the first regulator 21 is capable of supplying a stable power-supply voltage all the time to the IC unit 25.

Second Embodiment

Only differences between the first and second embodiments are explained. The second embodiment is different from the first embodiment in that, in the case of the second embodiment, different regulators supply power-supply voltages to the transmission circuit 23 and the IC unit 25. It is to be noted that, in the second embodiment, the ultrasonic-wave sensors with a processing function 20 to 50 have the same configuration. Thus, only the ultrasonic-wave sensor with a processing function 20 is explained in the following description.

Figure 2:
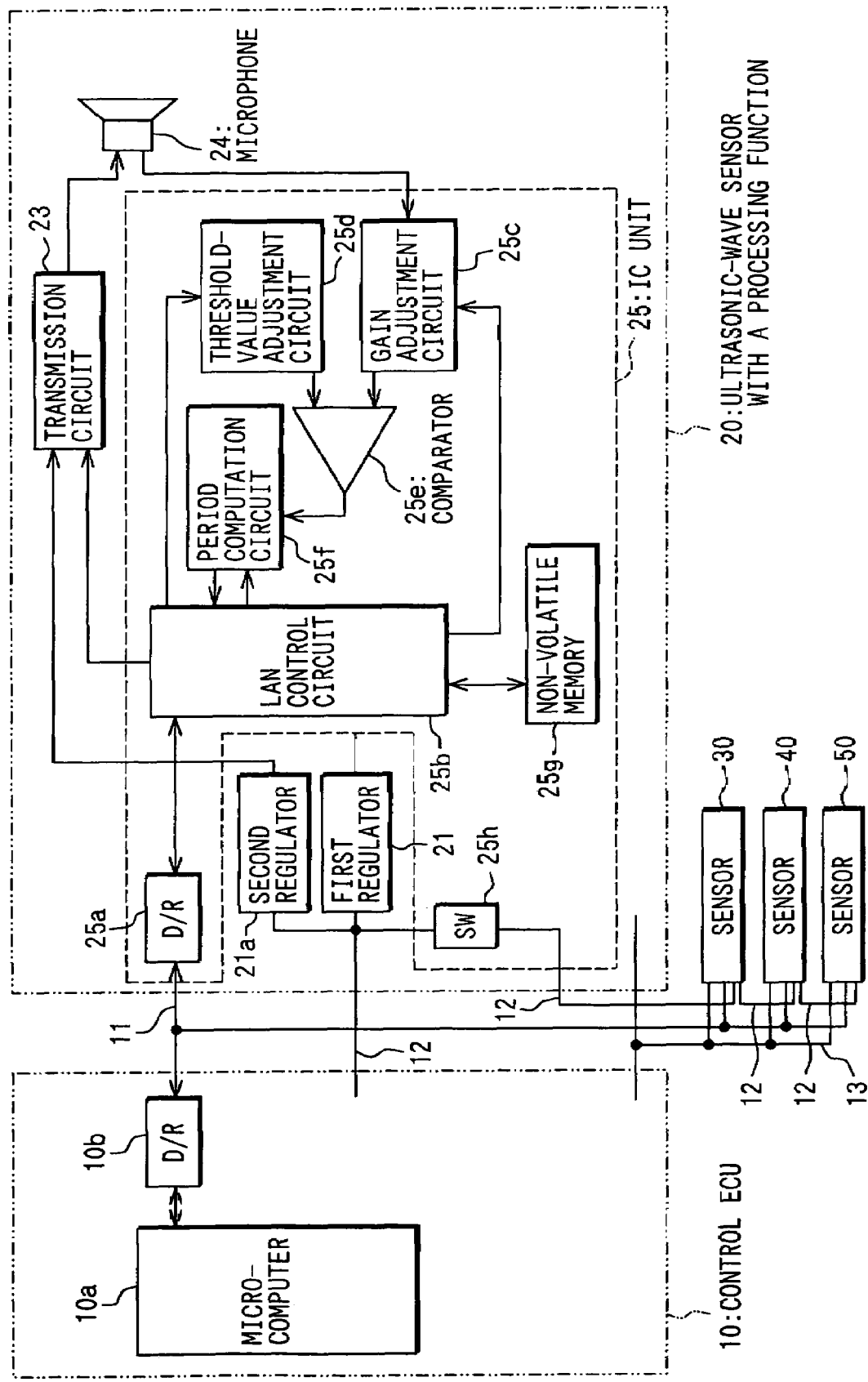
FIG. 2 is a block diagram showing the configuration of a vehicle-surroundings monitor apparatus according to a second embodiment.

FIG. 2 is a diagram showing the configuration of a vehicle-surroundings monitor apparatus according to the second embodiment. As shown in FIG. 2, the ultrasonic-wave sensor with a processing function 20 also has a second regulator 21a. Much like the first regulator 21 employed in the first embodiment, the second regulator 21a converts an input power-supply voltage into a constant voltage. It is to be noted that the second regulator 21a corresponds to a second constant-voltage circuit provided by the present invention.

When the control ECU 10 supplies a power-supply voltage to the ultrasonic-wave sensor with a processing function 20, the power-supply voltage is passed on to the first regulator 21 as well as the second regulator 21a. Then, the first regulator 21 converts the power-supply voltage into a constant voltage and supplies the constant voltage to the IC unit 25. On the other hand, the second regulator 21a converts the power-supply voltage into a constant voltage and supplies the constant voltage to the transmission circuit 23.

Thus, even when voltage variations occur in generation of an ultrasonic wave in the transmission circuit 23, the first regulator 21 and the second regulator 21a are capable of blocking effects of the variations in voltage. Thus, the voltage variations occurring in generation of an ultrasonic wave in the transmission circuit 23 do not have an effect on the IC unit 25. In addition, the first regulator 21 supplies a constant voltage to the IC unit 25 as described above. Thus, the IC unit 25 is capable of receiving a stable power-supply voltage all the time from the first regulator 21 in spite of the fact that the transmission circuit 23 generates an ultrasonic wave.

As described above, in this embodiment, when the control ECU 10 supplies a power-supply voltage to the ultrasonic-wave sensor with a processing function 20, the power-supply voltage is passed on to the first regulator 21 as well as the second regulator 21a through the first power-supply line 12. Then, the first regulator 21 converts the power-supply voltage into a constant voltage and supplies the constant voltage to the IC unit 25. On the other hand, the second regulator 21a converts the power-supply voltage into a constant voltage and supplies the constant voltage to the transmission circuit 23. Thus, the power-supply voltage supplied to the IC unit 25 can be separated from the power-supply voltage supplied to the transmission circuit 23. As a result, by virtue of the existence of the first regulator 21 and the second regulator 21a, the IC unit 25 is capable of receiving a stable power-supply voltage all the time from the first regulator 21 without being affected by voltage variations occurring in generation of an ultrasonic wave in the transmission circuit 23.

Third Embodiment

Only differences between a third embodiment and the first embodiment as well as the second embodiment are explained. The third embodiment is different from the first and second embodiments in that, in the case of the third embodiment, the transmission circuit 23 and the IC unit 25 receive power-supply voltages supplied by the control ECU 10 through different power-supply lines. It is to be noted that, in the third embodiment, the ultrasonic-wave sensors with a processing function 20 to 50 have the same configuration. Thus, only the ultrasonic-wave sensor with a processing function 20 is explained in the following description.

Figure 3:
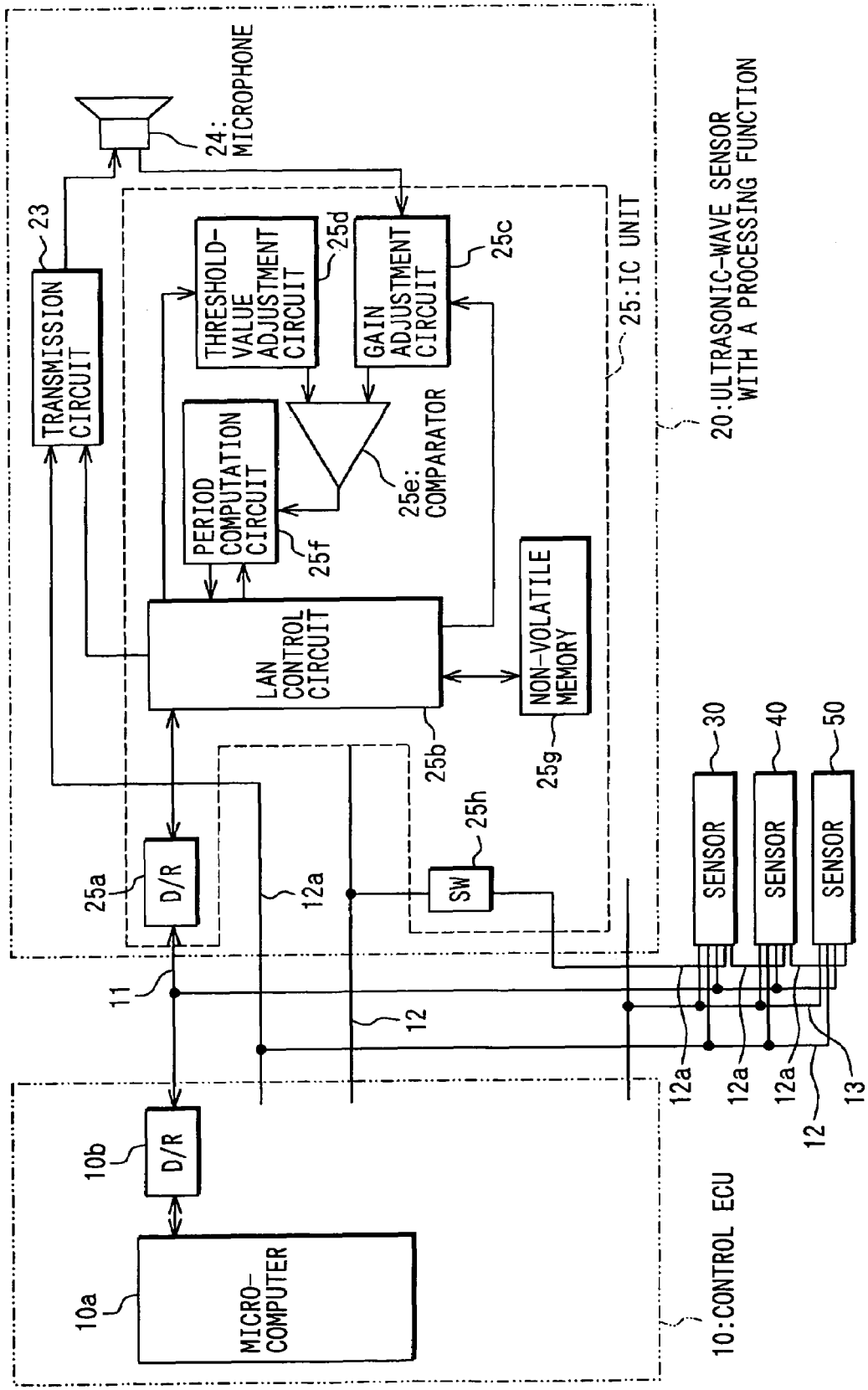
FIG. 3 is a block diagram showing the configuration of a vehicle-surroundings monitor apparatus according to a third embodiment.

FIG. 3 is a diagram showing the configuration of a vehicle-surroundings monitor apparatus according to the third embodiment. As shown in FIG. 3, in this embodiment, the control ECU 10 supplies a power-supply voltage to the IC unit 25 employed in the ultrasonic-wave sensor with a processing function 20 through the first power-supply line 12. On the other hand, the control ECU 10 supplies a power-supply voltage to the transmission circuit 23 employed in the ultrasonic-wave sensor with a processing function 20 through a second power-supply line 12a.

In the control ECU 10, the first power-supply line 12 and the second power-supply line 12a are electrically separated from each other. That is, the power-supply voltage supplied through the first power-supply line 12 and the power-supply voltage supplied through the second power-supply line 12a do not have an effect on each other. Thus, the control ECU 10 is capable of supplying power-supply voltages independent of each other through the second power-supply line 12a and the first power-supply line 12 to respectively the transmission circuit 23 and the IC unit 25, which are employed in the ultrasonic-wave sensor with a processing function 20.

Accordingly, voltage variations occurring in generation of an ultrasonic wave in the transmission circuit 23 do not have an effect on the first power-supply line 12 at all. That is, since the IC unit 25 connected to the first power-supply line 12 independent of the second power-supply line 12a is capable of receiving a stable power-supply voltage from the control ECU 10, the IC unit 25 is capable of operating in a stable manner without regard to the voltage variations occurring in the transmission circuit 23.

As described above, in this embodiment, the control ECU 10 supplies a power-supply voltage to the IC unit 25 employed in the ultrasonic-wave sensor with a processing function 20 through the first power-supply line 12. On the other hand, the control ECU 10 supplies a power-supply voltage to the transmission circuit 23 employed in the ultrasonic-wave sensor with a processing function 20 through a second power-supply line 12a. That is, the control ECU 10 supplies power-supply voltages to the transmission circuit 23 and the IC unit 25 through their respective dedicated power-supply lines. Thus, the power-supply voltage supplied to the IC unit 25 can be separated from the power-supply voltage supplied to the transmission circuit 23. As a result, voltage variations occurring in the transmission circuit 23 can be prevented from having an effect on the IC unit 25. In addition, the IC unit 25 is capable of receiving a stable power-supply voltage all the time from the control ECU 10.

Fourth Embodiment

Only differences between a fourth embodiment and the first to third embodiments are explained. The fourth embodiment is different from the first to third embodiments in that, in the case of the fourth embodiment, a power-supply voltage from the control ECU 10 is supplied only to the IC unit 25 through the first regulator 21. It is to be noted that, in the fourth embodiment, the ultrasonic-wave sensors with a processing function 20 to 50 have the same configuration. Thus, only the ultrasonic-wave sensor with a processing function 20 is explained in the following description.

Figure 4:
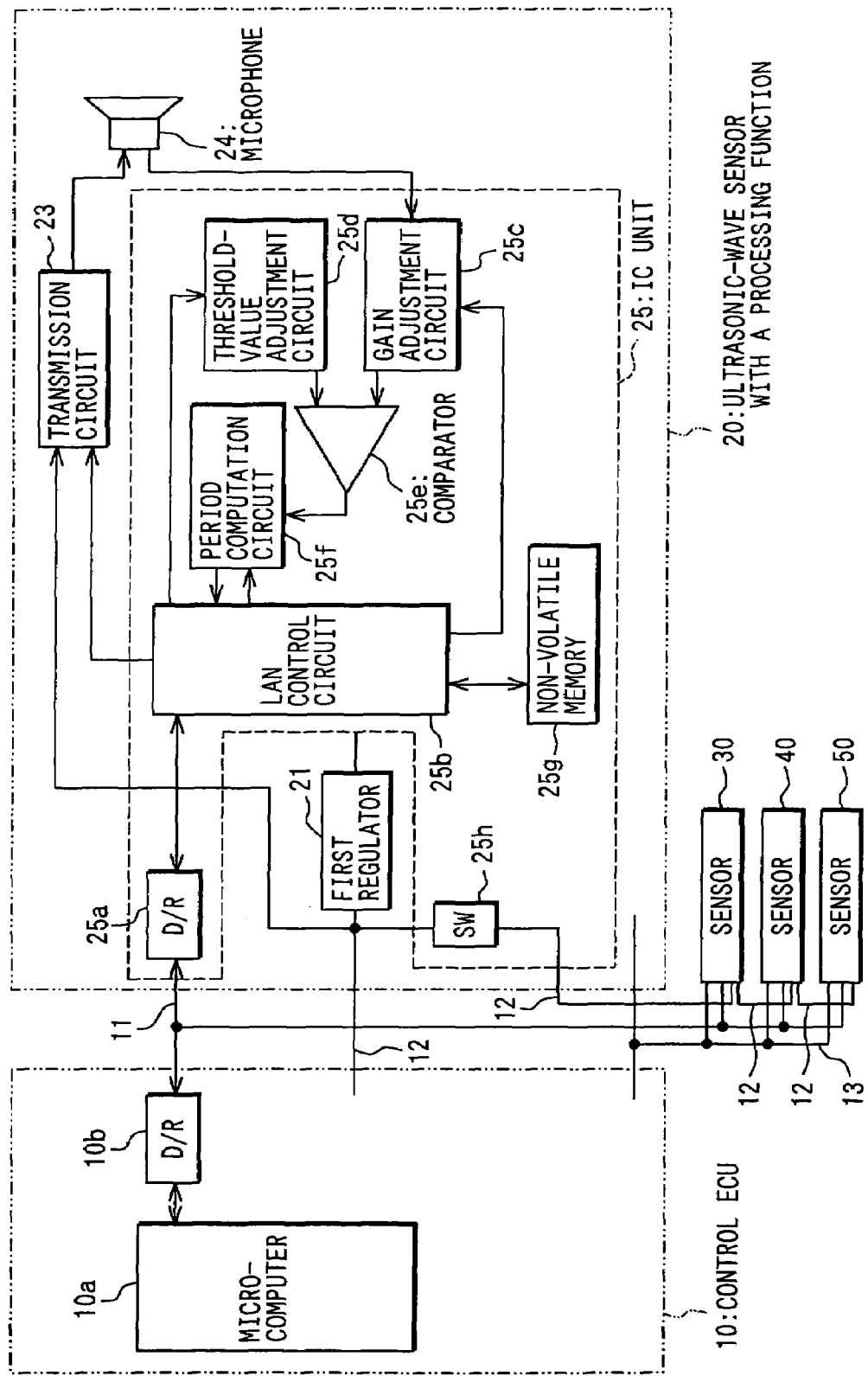
FIG. 4 is a block diagram showing the configuration of a vehicle-surroundings monitor apparatus according to a fourth embodiment.

FIG. 4 is a diagram showing the configuration of a vehicle-surroundings monitor apparatus according to the fourth embodiment. As shown in FIG. 4, the transmission circuit 23 employed in the ultrasonic-wave sensor with a processing function 20 receives a power-supply voltage directly from the control ECU 10. On the other hand, the IC unit 25 receives the power-supply voltage supplied by the ultrasonic-wave sensor with a processing function 20 by way of the first regulator 21, which converts the power-supply voltage into a constant voltage and then supplies the constant voltage to the IC unit 25. Since the IC unit 25 receives the power-supply voltage through the first regulator 21 in this way, the IC unit 25 receives a stable voltage.

Even when variations in voltage occur in the transmission circuit 23 while the transmission circuit 23 is generating an ultrasonic wave, the variations will not have an effect on the IC unit 25. That is, since the IC unit 25 receives a stable voltage all the time from the first regulator 21, voltage variations occurring in the transmission circuit 23 do not cause the power-supply voltage supplied to the IC unit 25 to fluctuate. Thus, the IC unit 25 is capable of operating normally at the power-supply voltage received from the first regulator 21.

As described above, in this embodiment, the transmission circuit 23 employed in the ultrasonic-wave sensor with a processing function 20 receives a power-supply voltage directly from the control ECU 10. On the other hand, the IC unit 25 receives the power-supply voltage supplied by the ultrasonic-wave sensor with a processing function 20 by way of the first regulator 21, which converts the power-supply voltage into a constant voltage and then supplies the constant voltage to the IC unit 25. Thus, since the IC unit 25 receives a constant voltage from the first regulator 21, the power-supply voltage supplied to the IC unit 25 is stable all the time.

Other Embodiments

In accordance with the first to fourth embodiments described above, the vehicle-surroundings monitor apparatus employs the ultrasonic-wave sensors with a processing function 20 to 50 . However, the number of ultrasonic-wave sensors with a processing function can be changed to any arbitrary integer. For example, four ultrasonic-wave sensors with a processing function can be installed on the front portion of the vehicle while four other ultrasonic-wave sensors with a processing function can be installed on the rear portion of the vehicle.

In accordance with the first to fourth embodiments described above, an ultrasonic wave is used. However, the transmitted beam is not limited to an ultrasonic wave. For example, the transmitted beam can also be an electric wave or an optical beam.

In accordance with the first to fourth embodiments described above, the ultrasonic-wave sensors with a processing function 20 to 50 are provided on the left rear side, the true rear side and the right rear side. However, the locations of the ultrasonic-wave sensors with a processing function 20 to 50 are not limited to the left rear side, the true rear side and the right rear side. The ultrasonic-wave sensors with a processing function 20 to 50 can also be provided on the front portion of the vehicle and/or the side portions of the vehicle to detect bodies existing on the front portion of the vehicle and/or the side portions of the vehicle.

In accordance with the first embodiment described above, a power-supply voltage output by the first regulator 21 is supplied to the transmission circuit 23 by way of the filter 22. As shown in none of the figures, however, the filter 22 can be placed between the first regulator 21 and the IC unit 25. In this configuration, a power-supply voltage output by the first regulator 21 is supplied to the transmission circuit 23 directly but the power-supply voltage is supplied to the IC unit 25 by way of the filter 22. Thus, the filter 22 placed between the first regulator 21 and the IC unit 25 blocks effects of voltage variations occurring in generation of an ultrasonic wave in the transmission circuit 23. As a result, the voltage variations occurring in generation of an ultrasonic wave in the transmission circuit 23 do not have an effect on the IC unit 25.

In accordance with the first to fourth embodiments described above, the ultrasonic-wave sensors with a processing function 20 to 50 each find a period T between transmission of an ultrasonic wave and reception of the reflected ultrasonic wave whereas the control ECU 10 computes a distance L between the vehicle and a body reflecting the ultrasonic wave based on the period T. However, the method to compute the distance L is not limited to that according to the first to fourth embodiments. For example, the LAN control circuit 25b employed in each of the ultrasonic-wave sensors with a processing function 20 to 50 may compute the distance L and output the computed distance L to the control ECU 10. As an alternative, a timing to transmit an ultrasonic wave and a timing to receive the reflected ultrasonic wave are supplied from each of the ultrasonic-wave sensors with a processing function 20 to 50 to the control ECU 10, and the control ECU 10 finds a period T between transmission of an ultrasonic wave and reception of the reflected ultrasonic wave, computing a distance L between the vehicle and a body reflecting the ultrasonic wave based on the period T.

The invention claimed is:
1. A vehicle-surroundings monitor apparatus having:
  a sensor comprising:
    a transmission/reception means for transmitting an ultrasonic wave to surroundings of a vehicle and receiving a reflected ultrasonic wave from the surroundings;
    a transmission circuit for generating an ultrasonic wave to be transmitted from the transmission/reception means;
    a reception-processing means for processing an ultrasonic wave received by the transmission/reception means;
    a regulator configured to supply the transmission circuit and the reception-processing means with substantially constant voltage; and
    a filter; and
  a control means for supplying a power-supply voltage to the sensor, wherein the vehicle-surroundings monitor apparatus is used for measuring a distance to a body existing in the vicinity of a vehicle employing the vehicle-surroundings monitor apparatus based on a period of time between transmission of the ultrasonic wave from the transmission/reception means and reception of the reflected ultrasonic wave by the transmission/reception means and is characterized in that a power-supply voltage supplied by the control means to the sensor is split into a power-supply voltage to be supplied to the transmission circuit and a power-supply voltage to be supplied to the reception-processing means, and the power-supply voltage to be supplied to the transmission circuit and the power-supply voltage to be supplied to the reception-processing means are supplied to the transmission circuit and the reception-processing means respectively,
  wherein the transmission circuit converts the power-supply voltage to be supplied to the transmission circuit into a pulse voltage of a predetermined frequency,
  wherein the filter is configured to absorb voltage variations arising when the transmission circuit outputs the pulse voltage such that the power-supply voltage to be supplied to the reception-processing means is substantially constant,
  wherein the filter is a low-pass filter configured to pass therethrough the power supply voltage supplied from the regulator and block high frequency components arising in the transmission circuit from the reception-processing means.

2. A vehicle-surroundings monitor apparatus according to claim 1, characterized in that the sensor comprises:
  a first constant-voltage circuit for converting the power-supply voltage received from the control means into a constant voltage determined in advance and outputting the constant voltage to the reception-processing means, wherein:
  the filter is further configured to absorb voltage variations in power-supply voltage, which results in the transmission circuit while the transmission circuit is generating an ultrasonic wave;
  a power-supply voltage generated by the control means is supplied to the first constant-voltage circuit employed in the sensor and converted by the first constant-voltage circuit into a constant power-supply voltage to be supplied to the reception-processing means and the filter; and
  a power-supply voltage supplied to the filter is fed to the transmission circuit.

3. A vehicle-surroundings monitor apparatus according to claim 1, characterized in that:
  the control means supplies a power-supply voltage to the sensor through a first power-supply wire and a power-supply voltage to the sensor through a second power-supply wire electrically separated from the first power-supply wire;
  the reception-processing means directly receives the power-supply voltage supplied by the control means through the first power-supply wire; and the transmission circuit directly receives the power-supply voltage supplied by the control means through the second power-supply wire.

4. A vehicle-surroundings monitor apparatus according to claim 1, characterized in that the sensor comprises a first constant-voltage circuit for converting the power-supply voltage received from the control means into a constant voltage determined in advance and outputting the constant voltage to the reception-processing means wherein:

the power-supply voltage supplied by the control means to the sensor is fed to the transmission circuit and the first constant-voltage circuit; and the power-supply voltage fed to the first constant-voltage circuit is converted into the constant voltage before being supplied to the reception-processing means.

5. A vehicle-surroundings monitor apparatus according to claim 1, characterized in that the control means is connected to a plurality of sensors by a communication line and the power-supply voltage is supplied from the control means to each of the sensors in a daisy-chain method.

* * * * *